United States Patent [19]

Nieter et al.

[11] Patent Number: 4,898,520
[45] Date of Patent: Feb. 6, 1990

[54] METHOD OF AND ARRANGEMENT FOR REDUCING BEARING LOADS IN SCROLL COMPRESSORS

[75] Inventors: Jeffrey J. Nieter, Coventry; Raymond L. DeBlois, Tolland, both of Conn.

[73] Assignee: United Technologies Corporation, Hartford, Conn.

[21] Appl. No.: 220,719

[22] Filed: Jul. 18, 1988

[51] Int. Cl.$^4$ .................. F04C 18/04; F04C 29/00
[52] U.S. Cl. ........................... 418/1; 418/55; 418/151
[58] Field of Search .............. 418/1, 55 R, 55 D, 151

[56] References Cited

U.S. PATENT DOCUMENTS 4,597,724 7/1986 Sato et al. ..................... 418/151

FOREIGN PATENT DOCUMENTS

| 236665 | 9/1987 | European Pat. Off. ............ 418/151 |
| 62-3186 | 1/1987 | Japan ................................. 418/151 |
| 62-13789 | 1/1987 | Japan ................................. 418/151 |
| 63-1783 | 1/1988 | Japan ............................... 418/55 R |

Primary Examiner—John J. Vrablik
Attorney, Agent, or Firm—Peter R. Ruzek

[57] ABSTRACT

A scroll compressor includes a fixed scroll element stationarily mounted on a support and an orbiting scroll element which is caused by an eccentric crank portion of a drive shaft to conduct an orbiting motion relative to the fixed scroll element. The drive shaft is rotatably mounted on the support by respective support bearings and carries a plurality of counterweights which have such respective masses and angular distributions about the shaft that the loadings of the support bearings by the drive shaft during the operation of the scroll compressor are minimized.

5 Claims, 7 Drawing Sheets

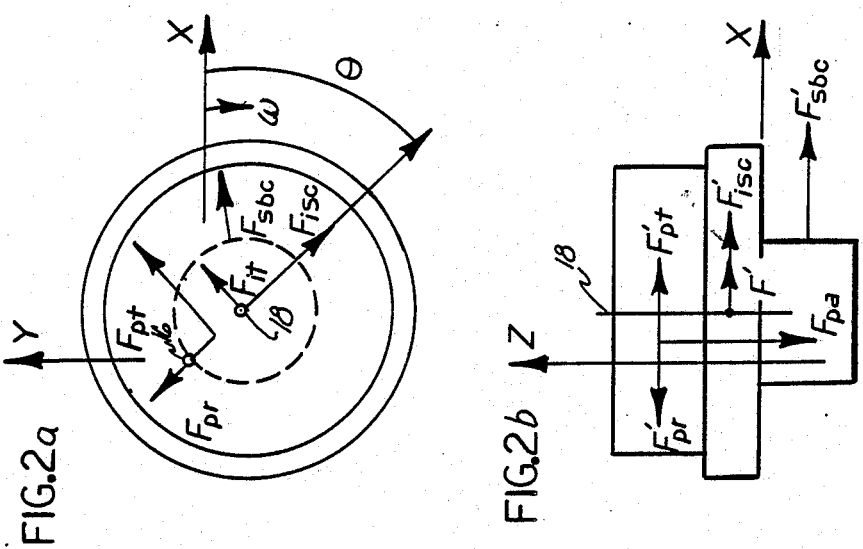
FIG.2a
FIG.2b
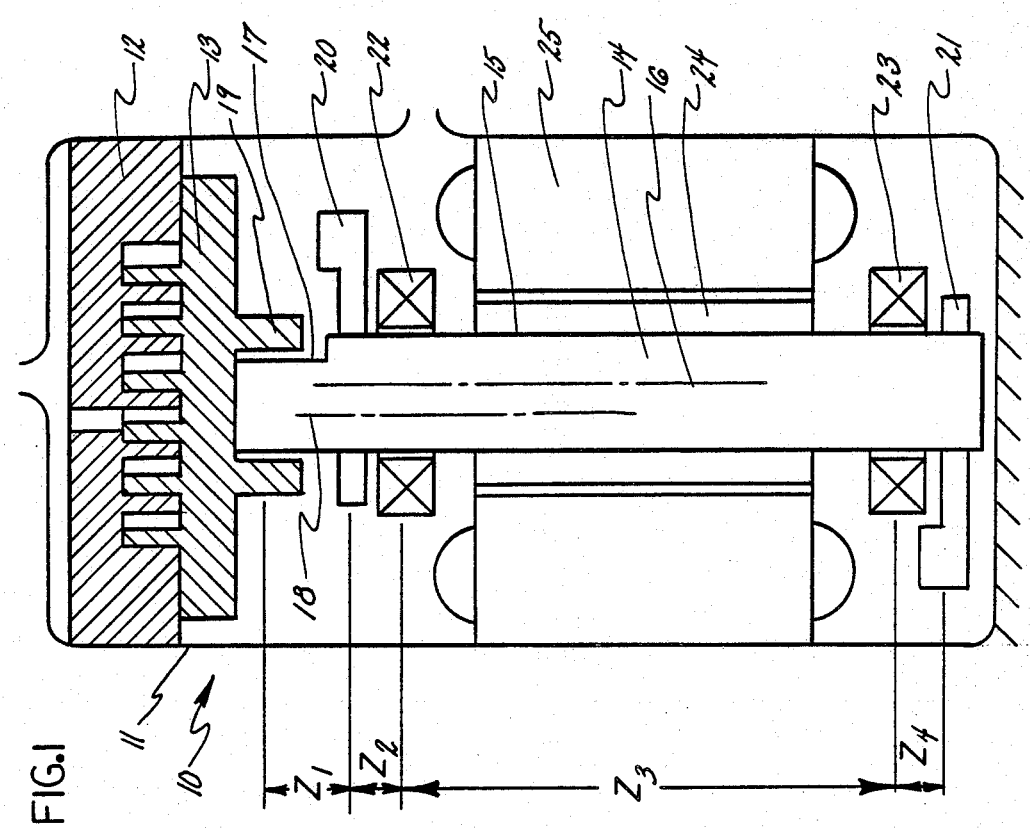
FIG.1

METHOD OF AND ARRANGEMENT FOR REDUCING BEARING LOADS IN SCROLL COMPRESSORS

TECHNICAL FIELD

The present invention relates to compressors in general, and more particularly to scroll compressors.

BACKGROUND ART

There are already known various constructions of compressors, among them so-called scroll or scroll-type vapor compressors which are becoming increasingly popular particularly for air conditioning applications, especially in the one-to-ten ton cooling capacity range. Among the characteristics that make such scroll compressors more attractive for many applications than reciprocating compressors are their high efficiency, reduced number of moving parts, low noise, and low vibration. An example of a scroll compressor of the type here under consideration is disclosed in the U.S. Pat. No. 4,715,796, for instance.

Major components of a typical scroll-type vapor compressor include a support usually constructed as a housing for some or all of the other major components, fixed and orbiting scroll elements, a drive shaft provided with an eccentric crank portion and mounted on the support for rotation by respective support bearings, and a drive motor which rotates the drive shaft about its axis so that the crank portion causes the orbiting scroll element to conduct orbiting motion relative to the fixed scroll element, with the orbiting element being prevented by an appropriate coupling arrangement of any known construction from rotating with the drive shaft while still being capable of conducting the desired orbiting movement. Vapor compression is achieved in at least one compression space bounded by the fixed and orbiting scroll elements as the orbiting scroll element is driven by the eccentric crank shaft portion, and the pressure of the medium being compressed acts on both the fixed scroll element and the orbiting scroll element. As a result of the rotational and particularly the eccentric and orbiting motions of the various components, and also of the forces attending the compression process, loads are transmitted to the drive shaft and reacted by the support bearings.

In an attempt to reduce the vibration and bearing loads, it has been already proposed to mount respective counterweights on the drive shaft for joint rotation with the drive shaft. In the heretofore proposed scroll-type compressor constructions in which the axis of the drive shaft may typically be oriented vertically and the scroll elements may be situated on top during the operation, the upper counterweight as considered in this mounting position is positioned close to the crank portion in the axial direction and 180 degrees from the crank portion in the circumferential direction, while the lower counterweight is much smaller than the upper counterweight and is circumferentially aligned with the crank portion.

Thus, the balancing of existing scroll compressors appears to follow the practice used with reciprocating compressors wherein only inertial forces are typically considered in sizing and positioning counterweights. While this approach is valid for reciprocating compressors since the pressure component of the resultant force vector acting on the crank fluctuates greatly in magnitude and somewhat in direction relative to the crank, and therefore cannot be dynamically balanced, experience has shown that in scroll compressors this approach results in a much higher degree of loading of the support bearings than necessary.

Accordingly, it is a general object of the present invention to avoid the disadvantages of the prior art.

More particularly, it is an object of the present invention to provide a scroll compressor which does not possess the disadvantages of the known compressors of this kind.

Still another object of the present invention is to develop the scroll compressor of the type here under consideration in such a manner as to reduce the loading of the support bearings of its rotating drive shaft under operating conditions.

It is yet another object of the present invention to design the scroll compressor of the above type in such a manner as to be relatively simple in construction, inexpensive to manufacture, easy to use, and yet reliable in operation.

A concomitant object of the present invention is to devise a method of balancing the compressor of the above type by choosing the sizes and positions of counterweights mounted on the crankshaft in such a manner as to minimize the support bearing loading.

DISCLOSURE OF THE INVENTION

In keeping with these objects and others which will become apparent hereafter, one feture of the present invention resides in a scroll compressor which comprises a support, a fixed scroll element stationarily mounted on the support, and an orbiting scroll element mounted for orbiting motion relative to the fixed scrollelement and bounding therewith at least one compression space. The scroll compressor of the present invention further includes means for admitting a medium to be compressed into and for discharging the medium from the compression space, a drive shaft having a main portion centered on an axis and an eccentric crank portion transversely offset from the axis, bearing means for supporting the main portion of the shaft on the support for rotation about the axis such that the crank portion acts on the orbiting scroll element, and means for rotating the drive shaft about the axis to cause the orbiting scroll element to conduct the orbiting motion with the medium being compressed in the compression space prior to its discharge, with attendant exertion of a resultant pressure force by the medium on the orbiting scroll element. In accordance with the present invention, there is further provided balancing means mounted on the drive shaft for rotation therewith about the axis and having such respective masses and angular distributions about the axis as to substantially compensate for the combined effect of other eccentric masses and of the resultant pressure force on the bearing means at least when the drive shaft rotates at a predetermined speed.

According to another aspect of the present invention, there is provided a method of balancing a scroll compressor in which a fixed scroll element is stationarily mounted on a support and an orbiting scroll element is caused by an eccentric crank portion of a drive shaft supported by respective bearings on the support for rotation about an axis to conduct orbiting motion relative to the fixed scroll element with which it bounds at least one compression space so that a medium being compressed in the compression space exerts a resultant pressure force on the orbiting scroll element. The method of the present invention comprises the steps of determining the magnitudes and directions of the resultant pressure force and of all inertial forces of eccentric masses at least at one speed of rotation of the drive shaft, calculating the masses and positions of at least two counterweights to be mounted on the drive shaft for joint rotation therewith about the axis such as to substantially compensate for the combined effect of the resultant pressure and inertial forces on the bearings at least during the rotation of the drive shaft at the one speed; and mounting the counterweights having the so calculated masses in the so calculated positions on the drive shaft for joint rotation therewith.

The present invention is based on the recognition of the fact that the above-mentioned approach to counterbalancing, which is appropriate for reciprocating compressors, is less then adequate for use in scroll compressors. This is so because a detailed analysis of the pressure forces occurring in a scroll compressor indicates that the pressure component of the resultant force vector that acts on the crank portion of the drive shaft is relatively constant in magnitude and direction relative to the crank portion (the vector direction rotates with crank angle at a nearly constant relative angle to crank). The pressure force component therefore acts in a similar manner as the inertial forces and, accordingly, can and should be considered, in accordance with the present invention, when sizing and locating counterweights during dynamic balancing of the compressor.

BRIEF DESCRIPTION OF THE DRAWING

The present invention will be described in more detail below with reference to the accompanying drawing in which:

FIG. 1 is a somewhat simplified axial sectional view of a scroll compressor of the type suited for the use of the present invention;

FIGS. 2a and 2b are respective diagrammatic top plan and side elevational views of the orbiting scroll element of the compressor of FIG. 1, indicating in a vectorial form the various forces acting on such an element;

BEST MODE FOR CARRYING OUT THE INVENTION

Figure 3B:
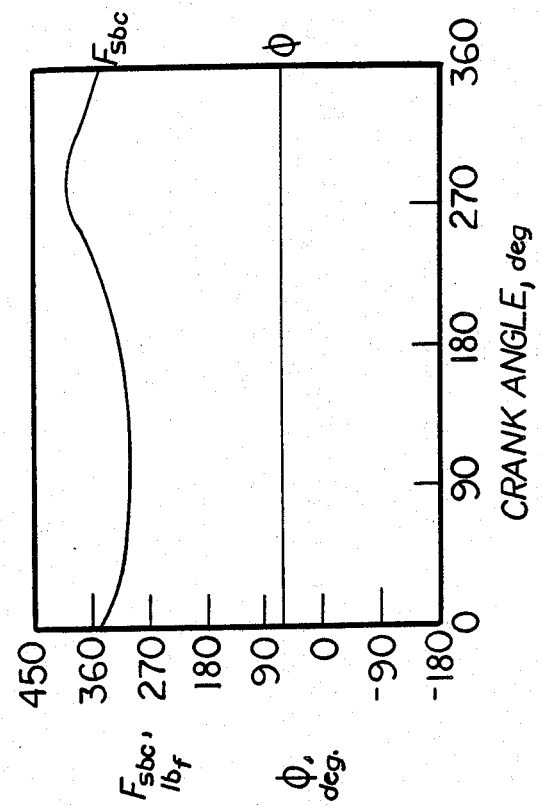
FIG. 3b is a graphic representation of the dependencies of the magnitude and the angle of the vector shown in FIG. 3a on the angular position of the crank portion of FIG. 1.

Referring now to the drawing in detail, and first to FIG. 1 thereof, it may be seen, that the reference numeral 10 has been used therein to identify a typical construction of a scroll compressor suited for employing the present invention. The scroll compressor 10 has been illustrated in a manner that is substantially simplified without, however, omitting any features needed for understanding the invention. A support or housing 11 and a fixed scroll 12 constitute the main stationary components of the scroll compressor 10. On the other hand, the main kinematic components of the scroll compressor 10 include an orbiting scroll element 13, and a crankshaft 14 having a main portion 15 centered on an axis 16 and an eccentric crank portion 17 which is transversely offset with respect to the main portion 15, being centered on an eccentric axis 18, and which acts on the orbiting scroll element 13 by being supported thereon by a scroll bearing 19. Such main kinematic components further include an upper counterweight 20 and a lower counterweight 21, as considered in the illustrated position which may be the operating position of the scroll compressor 10.

The drive shaft 14 is supported on the support 11 for rotation about the axis 16 by an upper shaft or support bearing 22 and a lower shaft or support bearing 23, and is driven in rotation, in the illustrated exemplary construction of the scroll compressor 10, by a motor rotor 24 that interacts with a motor stator 25 which is shown to be accommodated in, and is stationarily mounted on, the support or housing 11.

The orbiting motion of the orbiting scroll 13 causes various forces to be generated. Vectors of these forces are indicated in a top plan view of FIG. 2a and also correspondingly in a side elevational view of FIG. 2b. Radial, tangential and axial pressure forces, $F_{pr}$, $F_{pt}$ and $F_{pa}$, arise due to vapor pressure on the orbiting scroll 13. The radial and tangential pressure loads $F_{pr}$ and $F_{pt}$ can be calculated for any angle $\theta$ in accordance with the following equations:

$$F_{pr}(\theta) = 2ha(p_1 - p_{sc}) \quad (1)$$

$$F_{pt}(\theta) = 2ha\left(\sum_{i=1}^{N-1}(2\pi i - \theta)[p_i - p_{i+1}] + (2\pi N - \theta)[p_N - p_{sc}]\right) \quad (2)$$

wherein the above symbols have the following meanings:

$F_{pr}$ Radial pressure force due to orbiting scroll
$F_{pt}$ Tangential pressure force due to orbiting scroll
h Height of scroll wrap
a Base circle radius of scroll involute
$p_1, \ldots, p_N$ Pressure in scroll compression pockets
$P_{sc}$ Pressure in suction chamber surrounding orbiting scroll N Number of pairs of compression pockets at start of closed compression $\theta$ Crank angle i Index for pair of scroll compression pockets Radial and tangential inertia forces, $F_{isc}$ and $F_{it}$, are due to angular and centripetal acceleration, respectively, of the orbiting scroll 13, and they can be calculated using the following equations:

$$F_{isc} = m_{sc} r_{sc} \omega^2 \quad (3)$$

$$F_{it} = m_{sc} r_{sc} \alpha \quad (4)$$

wherein the above symbols have the following meanings:

$F_{isc}$ Radial inertia (centrifugal) force of orbiting scroll
$F_{it}$ Tangential inertia force of orbiting scroll
$m_{sc}$ Mass of orbiting scroll
$r_{sc}$ Radius from crankshaft axis to orbiting scroll axis
$\omega$ Angular velocity of crankshaft
$\alpha$ Angular acceleration of crankshaft It should be noted that in general, since a vapor compressor is run at a given speed for the operating condition required, and the speed of a scroll-type compressor fluctuates little at its operating condition, the angular acceleration is normally very low and therefore, $F_{it}$ can be disregarded.

Figure 3A:
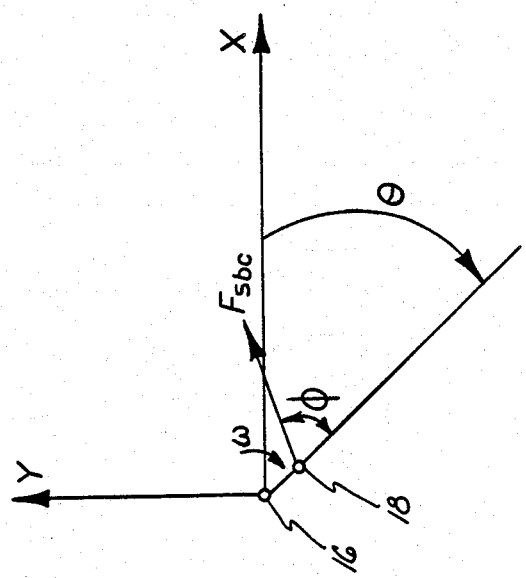
FIG. 3a is a graphic representation of one vector of FIG. 2a, indicating its spatial relationship with respect to a frame of reference.

During the operation of the scroll compressor 10, reaction forces to the aforementioned loads are produced at the orbiting scroll element bearing 19, as indicated in FIGS. 2a and 2b by a resultant force vector $F_{sbc}$ which is also shown in more detail as to its angular position in FIG. 3a.

It is shown in FIG. 3b that the magnitude of the resultant force $F_{sbc}$ generated by the orbiting scroll 13 in a typical scroll-type compressor 10 is relatively constant, with peak-to-peak fluctuations amounting to only about 20% of the average force. Even more importantly, the relative angle $\phi$ between the crank portion 17 and this resultant force $F_{sbc}$ is very nearly constant. Therefore, this resultant force $F_{sbc}$ generated by the motion of the orbiting scroll 13 acts in a manner similar to an inertia force in that it has a nearly constant magnitude and acts in a direction which rotates with the crank portion 17.

Figure 4:
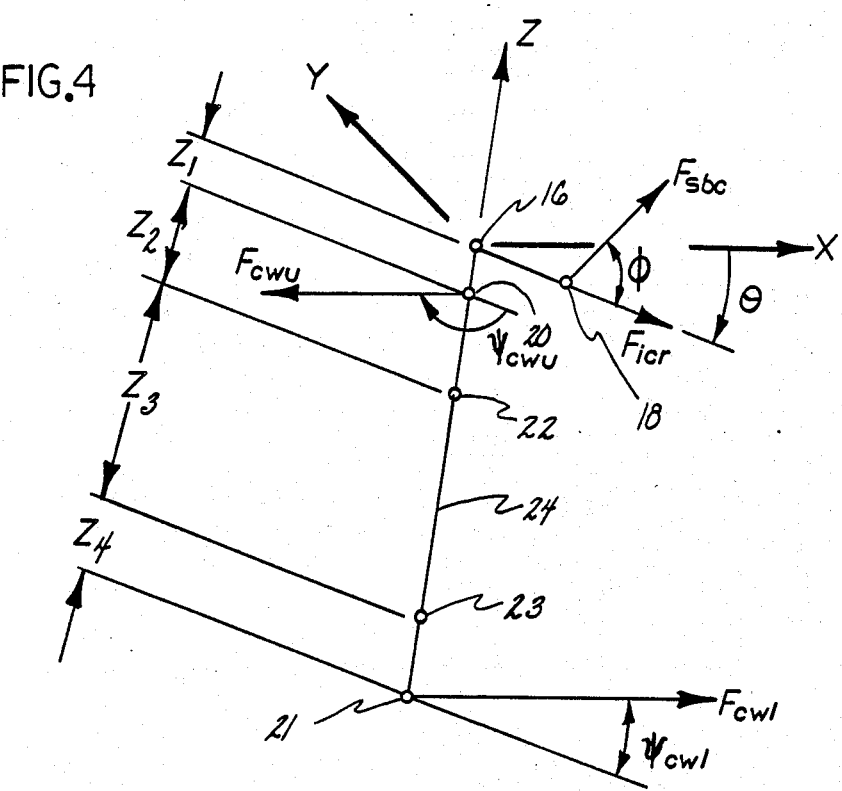
FIG. 4 is a perspective diagrammatic view of the axis of the shaft of FIG. 1 illustrating various forces acting on the shaft provided with the counterweights in accordance with the present invention during the operation of the scroll compressor at a predetermined speed.

In FIG. 4, the resultant force $F_{sbc}$ that is generated by the orbiting scroll motion is shown in a diagrammatic fashion as acting on the crank 17 of the drive shaft 14 carrying the kinematic components described above in conjunction with FIG. 1 and supported on the support bearings 22 and 23. The schematic representation of FIG. 4 uses small center-of-mass circles to indicate the relative axial positions of the crank portion 17, the upper counterweight 20, the lower counterweight 21, and the motor rotor 24. Centers of the shaft bearings 22 and 23 are also indicated by small circles. Force and moment balances can be made on the crankshaft 14 using FIG. 4, to arrive at the required inertia force and location of the counterweights 20 and 21 which produce zero reaction force at the shaft bearings 22 and 23. For this reason, no forces are shown in FIG. 4 at the shaft bearings 22 and 23. Any inertia force due to motor rotor eccentricity is neglected since it should be quite small.

The aforementioned force and moment balance needed for proper sizing and positioning of the counterweights 20 and 21 using the method of this invention (compensating both pressure and inertia forces) can be obtained from the following equations:

$$\Sigma F_x = 0 = F_{icr} \cos\theta + F_{sbc} \cos(\theta - \phi) +$$
$$F_{cwu} \cos(\theta + \psi_{cwu}) + F_{cwl} \cos(\theta + \psi_{cwl})$$

$$\Sigma F_y = 0 = -F_{icr} \sin\theta - F_{sbc} \sin(\theta - \phi) -$$
$$F_{cwu} \sin(\theta + \psi_{cwu}) - F_{cwl} \sin(\theta + \psi_{cwl})$$

$$\Sigma M_x = 0 = [F_{icr} \sin\theta + F_{sbc} \sin(\theta - \phi)]$$
$$(z_1 + z_2 + z_3 + z_4) + F_{cwu} \sin(\theta + \psi_{cwu})(z_2 + z_3 + z_4)$$

$$\Sigma M_y = 0 = [F_{icr} \cos\theta + F_{sbc} \cos(\theta - \phi)]$$
$$(z_1 + z_2 + z_3 + z_4) + F_{cwu} \cos(\theta + \psi_{cwu})(z_2 + z_3 + z_4)$$

which reduces to:

$$\tan(\psi_{cwu}) = \frac{-F_{sbc} \sin\phi}{F_{icr} + F_{sbc} \cos\phi}$$

$$F_{cwu} = F_{sbc} \frac{\sin\phi}{\sin\psi_{cwu}} C$$

$$\psi_{cwl} = \psi_{cwu} + \pi$$

$$F_{cwl} = F_{sbc} \frac{\sin\phi}{\sin\psi_{cwl}} (C - 1)$$

wherein the above symbols have the following meanings:

$z_1, z_2, z_3, z_4$ Lengths identified in FIG. 4

$\psi_{cwl}$ Phase angle of lower conterweight $\psi_{cwu}$ Phase angle of upper counterweight $$C = \frac{z_1 + z_2 + z_3 + z_4}{z_2 + z_3 + z_4}$$

Figure 5:
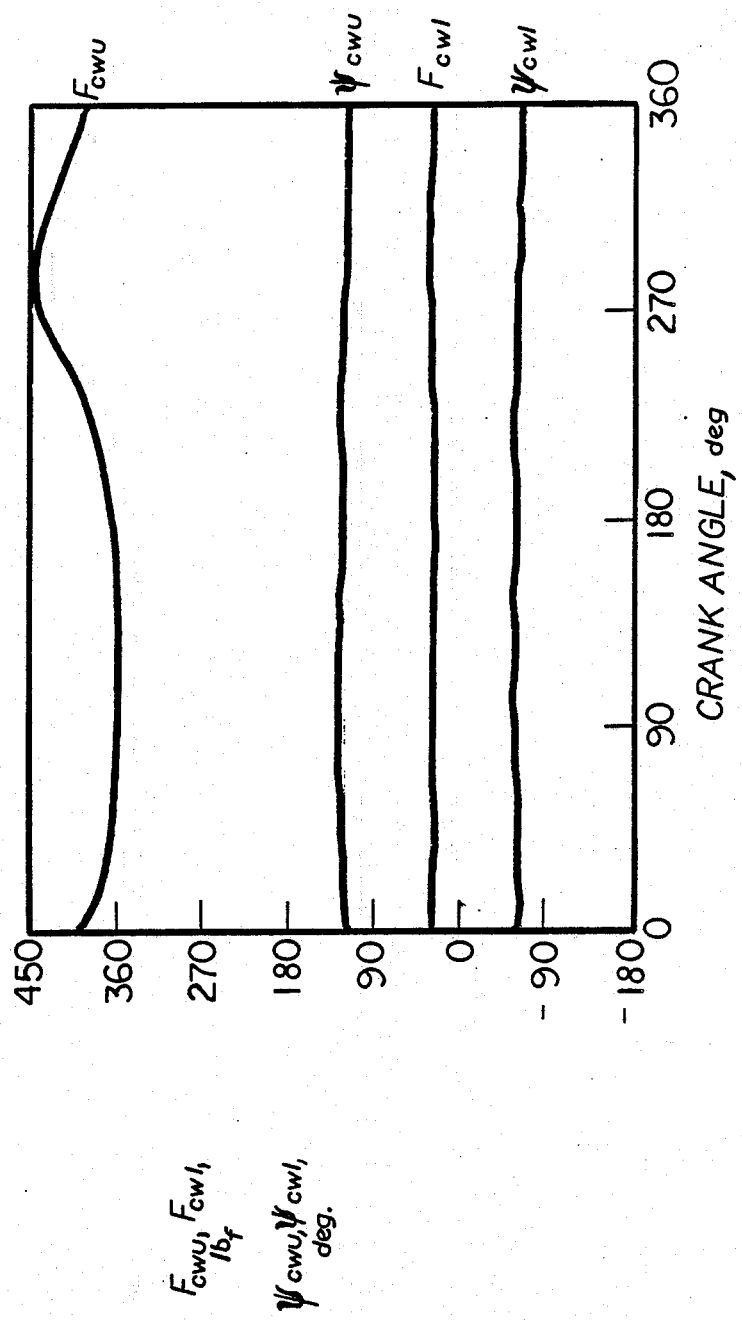
FIG. 5 is a graphic representation of the dependencies of the counterweight forces and angular locations on the crank angle according to the present invention.

An example of the results obtained when using the method of this invention is shown in FIG. 5 where the phase angles and inertia forces of the counterweights 20 and 21 are plotted versus the crank angle. FIG. 5 clearly shows that the magnitude of the inertia forces is relatively constant, especially for the lower counterweight 21, and that the angular location relative to the crank is nearly constant. If, then, the average value of inertia force and angular location is used for these 'ideal' counterweights 20 and 21, no additional complications are required in their design over conventional counterweights; basically, the counterweights 20 and 21 of the present invention will be substituted for the conventional counterweights, that is, they will be situated at the same axial regions of the drive shaft 14 as the conventional counterweights and only their sizes and angular positions will be different from those of the conventional counterweights, as shown in FIG. 6 of the drawing for the upper counterweight 20.

Thus, as mentioned before, this invention relates to an improved approach to counterbalancing radial and tangential loads generated in the scroll-type vapor compressor 10. The technique involves sizing and positioning counterbalance weights 20 and 21 on the drive shaft 14 such that the resultant load imparted by both the compression process and by the inertia of the moving scroll element 13 is nearly cancelled at the drive shaft support bearings 22 and 23. The result is a counterweight 20 that is larger than the conventional counterweight (indicated at 20') and is located at a crank angle less than 180 degrees.

Figure 7:
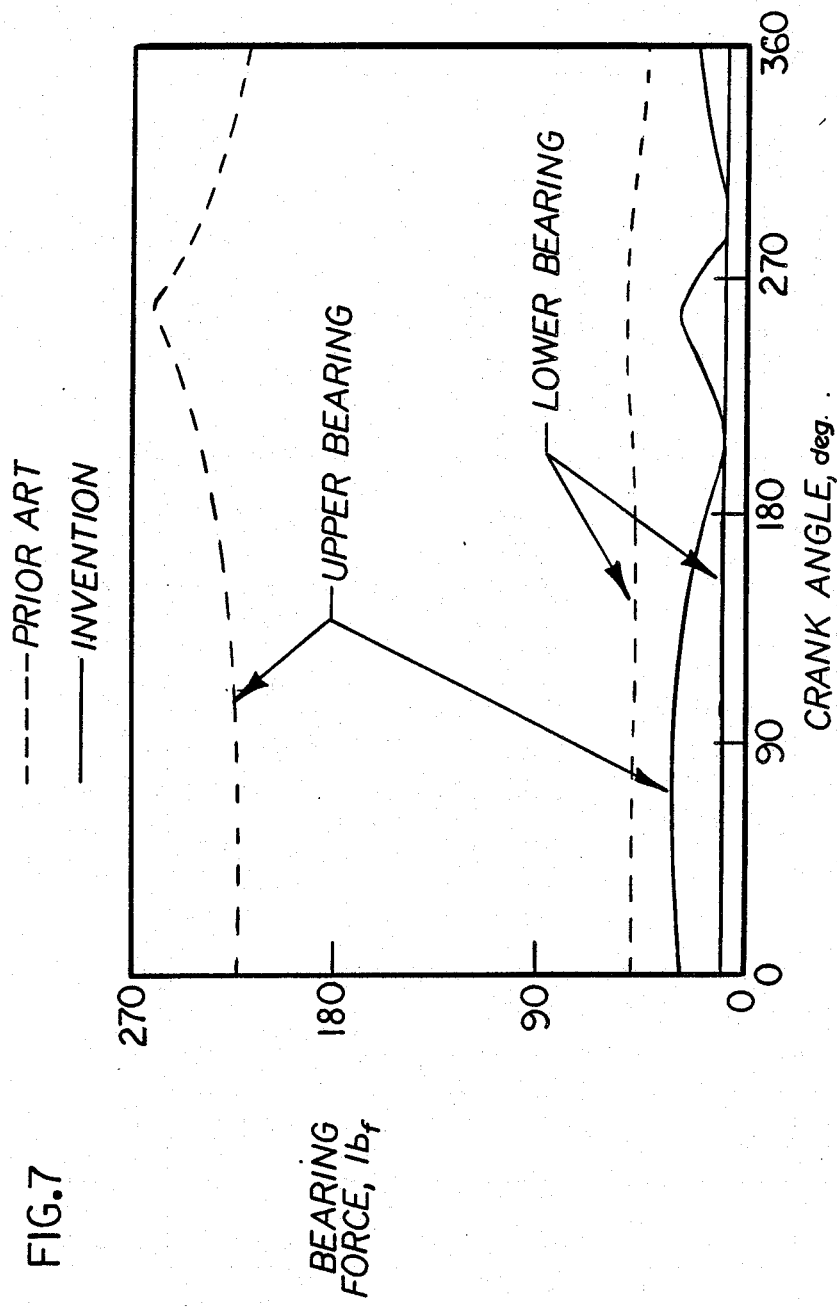
FIG. 7 is a graphic representation of the support bearing loads obtained by using the present invention in comparison with those encountered in accordance with the prior art.

Bearing loads calculated using the conventional balancing method, on the one hand, and the new balancing method proposed by the present invention, are shown in FIG. 7 for a compressor speed of 3600 RPM. As shown, the method of this invention results in much lower bearing loads than the prior art approach. Lower bearing loads in turn translate directly to increased reliability and life in existing scroll compressors. Consequently, expensive bearings used in existing scroll compressors (such as roller bearings) could be replaced with lower cost bearings (such as journal bearings) while maintaining or improving reliability and life of the compressor.

Figure 6:
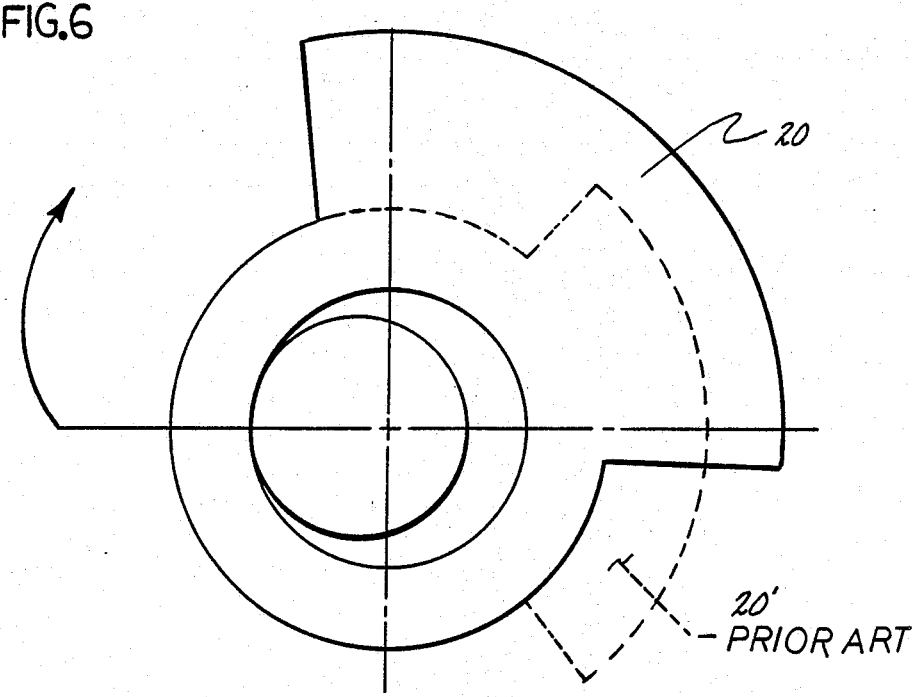
FIG. 6 is a top plan view of a top counterweight constructed in accordance with the present invention in comparison with that of the prior art.

For constant speed compressors, the counterweight used in accordance with this invention will be no more complex than those currently used, (i.e., fixed weight and position); however, the size and position of the counterweights will be different, as shown in FIG. 6.

Figure 8A:
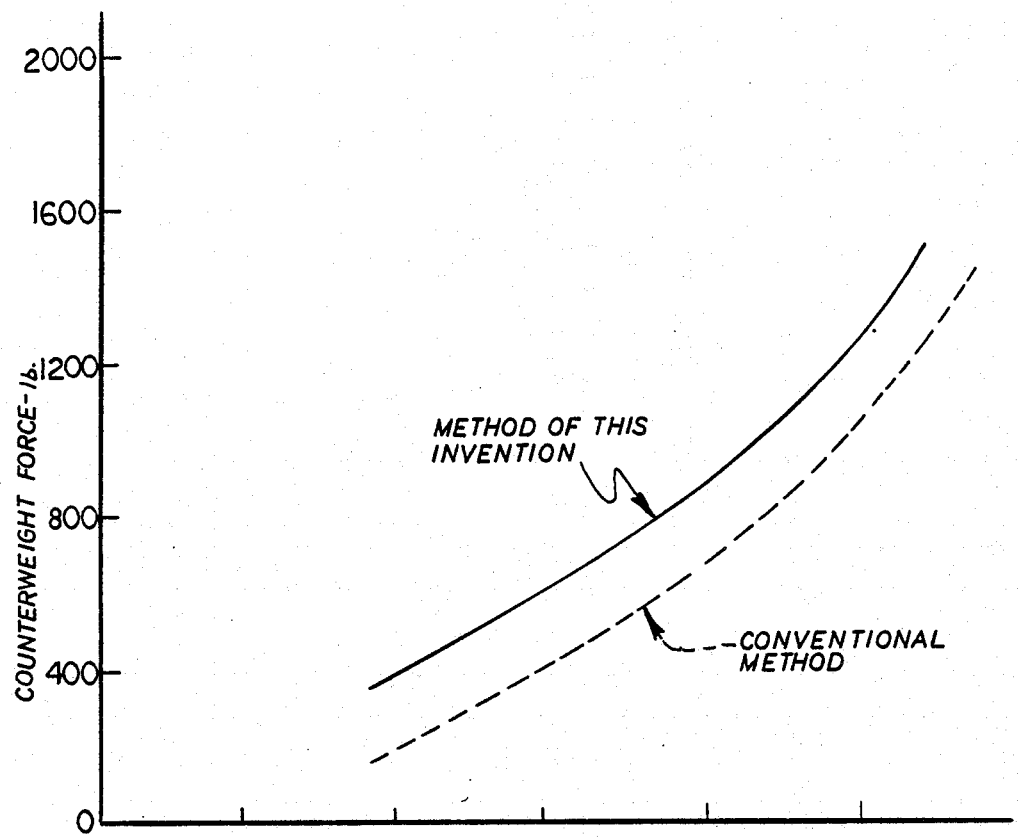
FIGS. 8a and 8b are graphic representations of the desired angle and force of the respective counterweight in dependence on the speed of rotation of the drive shaft.
Figure 8B:
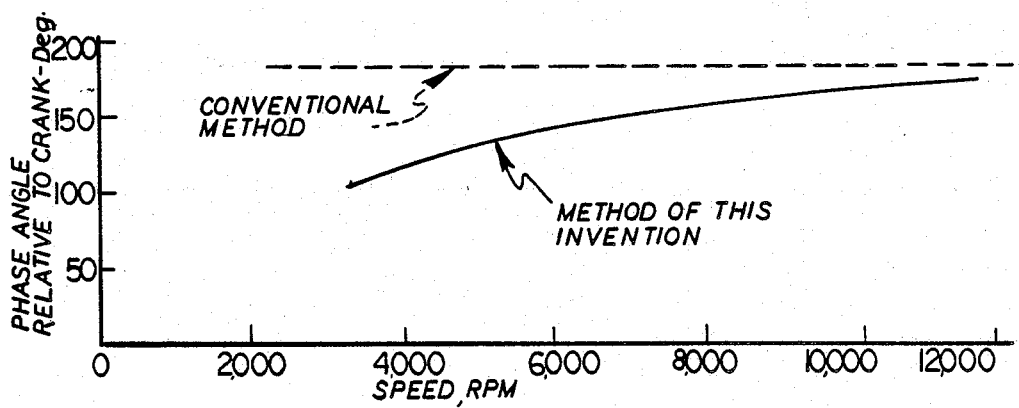
Figure 9:
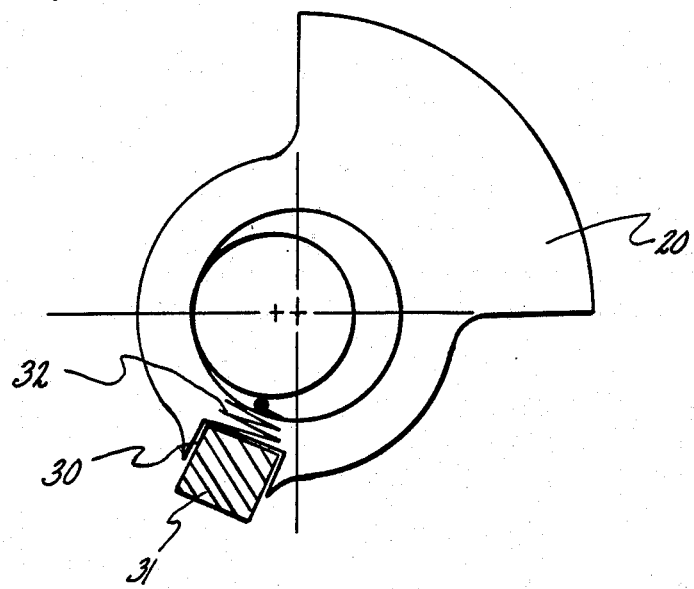
FIG. 9 is a view similar to that of FIG. 6 but showing an automatically adjustable counterweight constructed to take into consideration the conditions depicted in FIGS. 8a and 8b.

On the other hand, for variable speed compressors a mechanism may be included to effectively vary the force and location of the respective counterweight 20 and/or 21 as the speed is changed to achieve the characteristics shown in FIGS. 8a and 8b. Such a mechanism could be a relatively simple passive device such as shown conceptually in FIG. 9, wherein the counterweight 20 is shown to be provided with a recess 30 which accommodates in a sliding manner an adjustment counterweight member 31 that is acted upon by a tension spring 32. It will be appreciated that, as the speed of rotation of the shaft 14 increases, the counterweight member 31 will be displaced by the centrifugal force acting thereon against the force of the tension spring 32 more and more out of the recess 30, so that the inertia force exerted thereby increases correspondingly.

Figure 10:
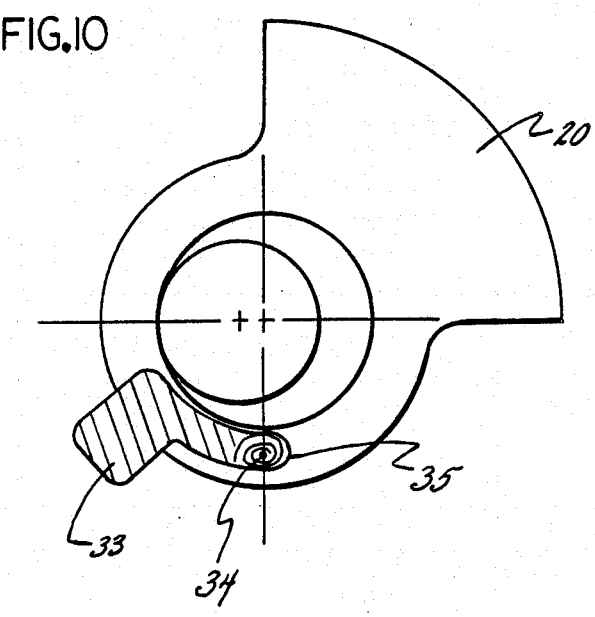
FIG. 10 is a view similar to that of FIG. 6 but showing a modified construction of the adjustable counterweight.

Another way of implementing the above mechanism is shown in FIG. 10. In this case, a counterweight element 33 is mounted on the counterweight 20 for pivoting about a pivot axis 34 as is acted upon by a torsion spring in the clockwise sense as considered in the drawing. Here again, the centrifugal force acting on the counterweight member 33 will displace the latter outwardly as the speed of rotation increases, but this time by pivoting the counterweight member 33 about the pivot 34 against the biasing action of the spring 35 in the counterclockwise direction, with attendant increase in the inertia force exerted by the counterweight member 33 via the spring 35 and the pivot 34 on the counterweight 20 and thus ultimately on the shaft 14. Obviously, the mass, the circumferential location, and the trajectory of movement of the speed-sensitive counterweight member 31 or 33, the spring constants, etc. are highly dependent on the compressor design parameters such as the weight of the orbiting scroll element 13, the axial placement of the counterweights 20 and 21, and the operating speed range. Nevertheless, once the other parameters of the variable-speed scroll compressor 10 are known, the counterweight member parameters can easily be calculated. The additional complexity of this variable geometry counterweight 31 or 33 can easily be justified in terms of lower bearing loads over a wide speed range.

While the present invention has been illustrated and described as embodied in a particular construction of a scroll compressor, it will be appreciated that the present invention is not limited to this particular example; rather, the scope of protection of the present invention is to be determined solely from the attached claims.

We claim:

1. A scroll compressor comprising
   a support:
   a drive shaft having a main portion centered on an axis and an eccentric crank portion transversely offset from said axis; bearing means for supporting said main portion of said shaft on said support for rotation about said axis;
   a fixed scroll element mounted on said support so as to be stationary relative thereto at least as far as rotation about said axis is concerned;
   an orbiting scroll element mounted for orbiting motion relative to said fixed scroll element, bounding therewith at least one compression space, and acted upon by said crank portion of said drive shaft;
   means for admitting a medium to be compressed into and for discharging said medium from said compression space;
   means rotating said drive shaft about said axis for said crank portion to cause said orbiting scroll element to conduct said orbiting motion with said medium being compressed in said compression space prior to its discharge with attendant exertion of a resultant pressure force by said medium on said orbiting scroll element and transmission of such force to said crank portion of said drive shaft, and application to said drive shaft of inertial forces resulting from rotation around said axis of eccentric masses of said drive shaft and said orbiting scroll element; and
   balancing means including at least two counterweights mounted on said drive shaft at mutually opposite sides of said bearing means for joint rotation with said drive shaft about said axis, each of said counterweights having such a mass and angular position about said axis that the counteracting inertial force exerted thereby on said drive shaft takes into account not only all of the inertial forces acting on said drive shaft but also pressure force for said counterweights to substantially compensate for the combined effect of all other eccentric masses and of said resultant pressure force on said bearing means at least when said drive shaft rotates at a predetermined speed.

2. The scroll compressor as defined in claim 1, wherein said bearing means includes at least two bearings spaced axially along said main portion of said drive shaft; and wherein each of said two counterweights is situated proximate to a different one of said bearings.

3. The scroll compressor as defined in claim 1, wherein each of said counterweights includes a main counterweight member mounted for joint rotation with said drive shaft about said axis and an auxiliary counterweight member mounted on said main counterweight member for movement along a predetermined path relative thereto, and means for resiliently urging said auxiliary counterweight member to a predetermined position along said path such that said auxiliary counterweight member is displaceable by centrifugal forces acting thereon during the rotation of said drive shaft out of said predetermined position and into another position along said path depending on the speed of rotation of said drive shaft, the force exerted on said auxiliary counterweight member by said urging means, the mass of said auxiliary counterweight member, and the course of said path being such that the balancing effect of said balancing means is in effect over a wide range of speeds of rotation of said drive shaft.

4. A method of balancing a scroll compressor in which a fixed scroll element is mounted on a support so as to be stationary relative thereto at least as far as rotation about a rotary axis is concerned and an orbiting scroll element is caused by an eccentric crank portion of a drive shaft supported by respective bearings on the support for rotation about the rotary axis to conduct orbiting motion relative to the fixed scroll element with which it bounds at least one compression space so that a medium being compressed in the compression space exerts a resultant pressure force on the orbiting scroll element, comprising the steps of determining the magnitudes and directions of the resultant pressure force and of all inertial forces of eccentric masses of the orbiting scroll and of the drive shaft at least at one speed of rotation of the drive shaft, calculating the masses and positions of at least two counterweights to be mounted on the drive shaft at opposite axial sides of the bearings for joint rotation with the drive shaft about the rotary axis such that the counteracting inertial force exerted by each of said counterweights on said drive shaft takes into account not only all of the inertial forces acting on said drive shaft but also said pressure force for said counterweights to substantially compensate for the combined effect of said resultant pressure and inertial forces on the bearings at least during the rotation of the drive shaft at said one speed; and providing counterweights having said masses in said positions on the drive shaft for joint rotation therewith.

5. The scroll compressor as defined in claim 3, wherein at least a portion of said course of said path circumferentially deviates from the radial direction of said drive shaft.

* * * * *